(12) United States Patent
Masoomzadeh et al.

(10) Patent No.: US 12,494,841 B1
(45) Date of Patent: Dec. 9, 2025

(54) SYSTEM FOR PROVIDING COMMUNICATION TO A MOBILE USER TERMINAL

(71) Applicant: AMAZON TECHNOLOGIES, INC., Seattle, WA (US)

(72) Inventors: Ali Masoomzadeh, Bellevue, WA (US); Deepak, Sammamish, WA (US); Sandeep Ahluwalia, Sammamish, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 503 days.

(21) Appl. No.: 17/930,131

(22) Filed: Sep. 7, 2022

(51) Int. Cl.
| | |
|---|---|
| *H04B 7/185* | (2006.01) |
| *H04W 36/32* | (2009.01) |
| *H04W 64/00* | (2009.01) |

(52) U.S. Cl.
CPC ...... *H04B 7/18513* (2013.01); *H04W 36/322* (2023.05); *H04W 64/00* (2013.01)

(58) Field of Classification Search
CPC . H04B 7/18513; H04W 36/322; H04W 64/00
See application file for complete search history.

(56) References Cited

U.S. PATENT DOCUMENTS

| | | | |
|---|---|---|---|
| 11,206,078 B1* | 12/2021 | Masoomzadeh | ..... H04B 7/2041 |
| 11,336,364 B1* | 5/2022 | Masoomzadeh | .... H04W 64/006 |
| 2013/0247188 A1* | 9/2013 | Tofighbakhsh | ..... H04L 63/1408 726/22 |
| 2017/0105153 A1* | 4/2017 | Ashrafi | ................ H04B 17/336 |
| 2019/0349072 A1* | 11/2019 | Darapu | ................... G01S 19/22 |
| 2021/0389972 A1* | 12/2021 | Muth | .................. H04L 25/4904 |
| 2023/0262596 A1* | 8/2023 | Reis | ..................... H04W 52/367 370/329 |

* cited by examiner

*Primary Examiner* — Raymond S Dean
(74) *Attorney, Agent, or Firm* — Lindauer Law, PLLC

(57) ABSTRACT

A constellation of satellites provides communication services to user terminals (UTs). Some UTs may be fixed while others are mobile. Each satellite provides communication services to discrete geographic areas or "spots" on and above the Earth. The mobile UT may operate in various modes. In a normal mode, communication resources within a single spot are allocated to a mobile UT. An obfuscated mode allocates the mobile UT communication resources in many spots, even though the mobile UT is only physically present in one. A whisper mode minimizes transmission from the mobile UT. With the exact location of the mobile UT unknown to the satellites, the mobile UT may send a handover request that is used to schedule a handover to other satellite(s), providing ongoing communication service while the mobile UT moves. In some implementations the handover request is determined in advance. A quiet mode facilitates the mobile UT receiving only.

20 Claims, 9 Drawing Sheets

SYSTEM FOR PROVIDING COMMUNICATION TO A MOBILE USER TERMINAL

BACKGROUND

A constellation of satellites may provide communication services to many user terminals. Some user terminals may be mobile.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
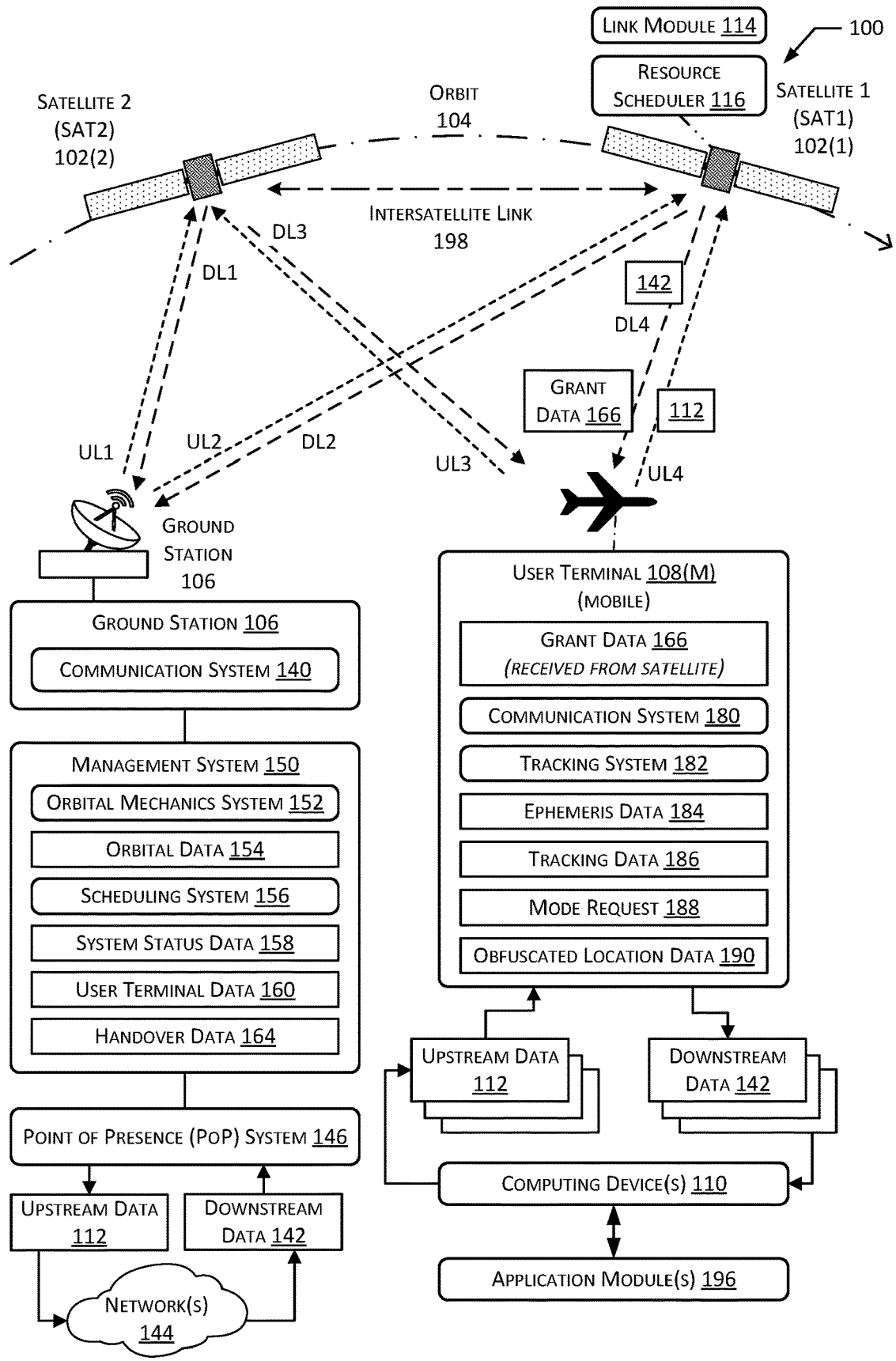
FIG. 1 illustrates a satellite system to support several modes to mobile user terminals including an obfuscated mode, a whisper mode, and a quiet mode, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A communications system may utilize a constellation of satellites to wirelessly transfer data between user terminals and ground stations that in turn connect to other networks, such as the Internet. Some of these user terminals may remain stationary during operation, while others are mobile user terminals that change their location over time while maintaining communication with the constellation.

Signals between the UT and the satellite are limited to travelling at the speed of light. The farther away a satellite is from the UT, the longer it takes for a signal to travel to the satellite and then travel back to Earth. For example, a hop (sending a signal to the satellite and back down to the ground, or vice versa) to a geosynchronous satellite introduces a delay of at least 240 milliseconds (ms). Additional delays due to signal processing, buffering, and so forth are also present. Such delays, or latency, are undesirable for many types of communication. For example, time-sensitive communication activities such as remote control of devices, industrial reporting and control, gaming, and so forth may be adversely affected by these latencies. In comparison, a hop involving a non-geosynchronous orbit (NGO) satellite at an altitude of 600 km only introduces about 4 ms of latency comprising 2 ms up to the satellite and 2 ms down to the UT. As a result, compared to using geosynchronous satellites, the use of NGO satellites significantly reduces latencies due to signal travel times.

Using a constellation of many NGO satellites offers significant benefits compared to a geosynchronous satellite. Latency is dramatically reduced, improving usefulness for communication. Shorter distances between the UT and the satellite allow for increased UT density by allowing greater frequency re-use and sharing. Power and antenna gain requirements for both the UT and the satellites are also reduced due to the shorter distances compared to communication using geosynchronous satellites. This allows for relatively smaller and less expensive satellites to be used.

The Earth may be divided into geographic areas or "spots". Given the relatively short distances and gain provided by antennas on NGO satellites, these spots may be relatively small. For example, a spot provided by a geosynchronous satellite may include an area that is thousands of miles on a side. In comparison, a spot provided by an NGO satellite may be tens of kilometers on a side.

To maximize the utilization of the communication resources with a satellite, a UT may report current location data indicative of where the UT is located. For example, a global navigation satellite system (GNSS) such as the Global Positioning System (GPS) may provide current location data that is accurate to within 4.9 meters or less. Based on this information the UT may be allocated communication resources to send upstream data on an uplink to the satellite and communication resources for sending downstream data to the UT.

While operating in a normal mode a mobile UT (MUT) provides precision current location data to at least a portion of the communication system, such as to a satellite. Based on the current location data, a resource scheduler allocates communication resources associated with access to a downlink and uplink in a single spot that the MUT is currently within. As the MUT approaches a border with another spot, handover data is generated based on the current location data sent to the resource scheduler. Based on the current location data, speed, direction, and other information, handover data may be generated and provided to the MUT, allowing a seamless transfer of communication services while the MUT moves from one spot to another while minimizing overallocation of resources that would reduce overall system efficiency.

In some circumstances it is advisable for the MUT to not report current location data. For example, an uncrewed aerial vehicle may include an MUT to provide communication service. The operator of the vehicle may choose to not provide precise current location data about the vehicle to the communication system.

Likewise, it may be advisable to avoid operating the satellite(s) in the constellation such that the whereabouts of the vehicle that includes the MUT may be inferred. Continuing the earlier example, if the MUT is only allocated communication resources for a single spot, detecting a transmission from a satellite to that spot is indicative of the MUT and associated vehicle being within the boundary of the spot. With the use of smaller spot sizes, this may indicate the whereabouts of the MUT with an accuracy greater that the operator would prefer.

Described in this disclosure are systems and techniques for providing several operating modes to an MUT. These modes may be used to reduce the ability of another party to determine the actual location of the MUT during operation. While operating in an obfuscated mode, obfuscated location data associated with the MUT is used to allocate communication resources associated with a plurality of spots. While operating in a whisper mode, the MUT may use the obfuscated location data and limit use of the uplink to reduce transmission. While operating in a quiet mode, the MUT may use the obfuscated location data and avoid transmission. Compared to the current location data used during normal mode, the obfuscated location data is less accurate and may be intentionally offset from the current location data. For example, the current location data may indicate a geolocation within meters while the obfuscated location data may be indicative of one or more spots.

By using the system and techniques described in this disclosure, precision information about the whereabouts of an MUT may be obscured from a third party. As a result, operational security of an MUT may be substantially improved.

ILLUSTRATIVE SYSTEM

The ability to communicate between two or more locations that are physically separated provides substantial benefits. Communications over areas ranging from counties, states, continents, oceans, and the entire planet are used to enable a variety of activities including remote sensing, remote operation of devices, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication services. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because the period of the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites is limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies. As a result, the "footprint" of a radio signal emitted from a geosynchronous satellite may cover a very large area of the Earth. For example, a relatively narrow beam from a geosynchronous satellite's antennas may cover several thousands of square kilometers of the Earth.

Using a geosynchronous satellite to provide communication services also introduces a significant latency or delay because of the time it takes for a signal to travel up to the satellite in geosynchronous orbit and back down to a device on or near the ground. The latency due to signal propagation time of a single hop can be at least 240 milliseconds (ms). This latency can be unacceptable in situations where the data is time sensitive, such as for remote control of equipment or to provide near-realtime tracking data.

To alleviate these and other issues, satellites in NGOs may be used. The altitude of an NGO is high enough to provide an individual satellite with a coverage of a relatively large portion of the ground, while remaining low enough to minimize latency due to signal propagation time. For example, the lower altitude of the satellite in NGO, compared to a geosynchronous orbit, provides coverage over a much smaller portion of the Earth. The lower altitude also reduces the distance the electromagnetic signal has to travel. For example, the satellite at 600 km only introduces 4 ms of latency for a single hop. Compared to the geosynchronous orbit, the reduced distance of the NGO reduces the dispersion of electromagnetic signals. As a result, the geographic areas or "spots" of the Earth that are covered by a beam from the satellite in the NGO may be much smaller than that of a geosynchronous satellite. For example, a spot provided by the antenna array of an NGO satellite may be tens of kilometers or smaller on a side, compared to the thousands of kilometers of a spot of an antenna array onboard a geosynchronous satellite. This allows the satellite in NGO as well as the device communicating with the satellite to use a less powerful transmitter, use smaller antennas, and so forth.

The system 100 shown here comprises a plurality (or "constellation") of communication satellites 102(1), 102(2), . . . , 102(S), each communication satellite 102 being in orbit 104. Also shown is a ground station 106, user terminals (UTs) 108, and computing devices 110. Each computing device 110 may execute one or more application modules 196. For example, the application modules 196 may comprise email applications, telephony applications, videoconferencing applications, telemetry applications, remote sensing applications, telecontrol applications, and so forth.

The constellation may comprise hundreds or thousands of satellites 102, in various orbits 104. For example, one or more of these satellites 102 may be in non-geosynchronous orbits (NGOs) in which they are in constant motion with respect to the Earth, such as a low earth orbit (LEO). In this illustration, orbit 104 is depicted with an arc pointed to the right. A first satellite (SAT1) 102(1) is leading (ahead of) a second satellite (SAT2) 102(2) in the orbit 104.

Each satellite 102 may include a link module 114 and resource scheduler 116. The link module 114 is used to establish communication with other devices. The link module 114 may include one or more processors, transmitters, receivers, antennas, digital signal processors, and so forth. The resource scheduler 116 may comprise one or more processors executing instructions to manage the link module 114 and maintain communication service such as a radio communication link with other devices. For example, the resource scheduler 116 may receive requests for allocation of uplink resources from individual UTs 108, determine grant data 166 allocating uplink resources to the requesting UTs 108, send the grant data 166 to the requesting UTs 108, and so forth. The resource scheduler 116 may also allocate downlink resources during operation. Operation of the resource schedulers 116 onboard a plurality of satellites 102 may also be responsive to mode requests 188 associated with one or more mobile UTs (MUTs) 108(M) as described below. The satellite 102 is discussed in more detail with regard to FIG. 2.

The resource scheduler 116 may determine resource allocation such as timeslot, frequency, and so forth that are allocated to particular spots or geographic areas.

A ground segment of the system 100 may comprise one or more ground stations 106 that are in communication with one or more satellites 102. The ground stations 106 may pass data between the satellites 102, a management system 150, networks 144 such as the Internet, and so forth. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground segment may include or utilize one or more communication networks 144. For example, the ground station 106 may connect to a terrestrial fiber optic communication network 144. The ground station 106 may act as a network gateway, passing data between the one or more communication networks 144 and the satellites 102, between ground stations 106, and so forth. Such data may be processed by the ground station 106 and communicated via the communication system 140. The communication system 140 of a ground station 106 may include components similar to those of the communication system of a satellite 102 and may perform similar communication functionalities. For example, the communication system 140 may include one or more modems, digital signal processors, power amplifiers, antennas (including at least one antenna that implements multiple antenna elements, such as a phased antenna arrays), processors, memories, storage devices, communications peripherals, interface buses, and so forth.

The ground stations 106 are in communication with a management system 150. The management system 150 is also in communication, via the ground stations 106, with the satellites 102 and the UTs 108. The management system 150 coordinates operation of the satellites 102, ground stations 106, UTs 108, and other resources of the system 100. The management system 150 may comprise one or more of an orbital mechanics system 152 or a scheduling system 156. The management system 150 may comprise one or more servers or other computing devices. In some implementations, the management system 150 may determine if a mode request 188 received from an MUT 108(M) is valid and modify operation of the system 100 according to valid mode requests 188. For example, the management system 150 may determine whether a particular MUT 108(M) is permitted to utilize the obfuscated mode, whisper mode, quiet mode, and so forth as described below. In some implementations the management system 150 may initiate a mode selection without receiving a mode request 188. For example, a specified MUT 108(M) may be pre-determined to operate in a specified mode, such as the obfuscated mode. The management system 150 may send data to the associated satellites 102 to provide the specified mode.

The orbital mechanics system 152 determines orbital data 154 that is indicative of a state of a particular satellite 102 at a specified time. In one implementation, the orbital mechanics system 152 may use orbital elements that represent characteristics of the orbit 104 of the satellites 102 in the constellation to determine the orbital data 154 that predicts location, velocity, and so forth of particular satellites 102 at particular times or time intervals. For example, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth.

The scheduling system 156 schedules resources to provide communication to the UTs 108. For example, the scheduling system 156 may determine handover data 164 that indicates when communication is to be transferred from the first satellite 102(1) to the second satellite 102(2). Continuing the example, the scheduling system 156 may also specify communication parameters such as frequency, timeslot indicative of when transmission is permitted, and so forth. During operation, the scheduling system 156 may use information such as the orbital data 154, system status data 158, user terminal data 160, and so forth. In some implementations, the scheduling system 156 may implement one or more of the operations described with respect to the resource scheduler 116.

The system status data 158 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of data. In another example, the system status data 158 may be indicative of future status, such as a satellite 102 being unavailable to provide communication service due to scheduled maneuvering, scheduled maintenance, scheduled decommissioning, and so forth.

The user terminal data 160 may comprise information such as a geographic location (geolocation) of a particular UT 108. This may comprise current location data or obfuscated location data 190. The current location data is associated with a first accuracy of the reported position relative to a ground truth or absolute position. For example, the current location data may comprise information about a particular MUT 108(M) that is accurate (relative to the Earth) to less than a specified threshold, such as 100 meters. In contrast, the obfuscated location data 190 is associated with a second accuracy that is less than the first accuracy of the current location data. For example, the second accuracy of the obfuscated location data 190 may indicate the location of the particular MUT 108(M) at between 100 km and 1000 km. The obfuscated location data 190 is discussed in more detail with regard to FIGS. 3-9.

The user terminal data 160 may also include other information such as a current operating mode, priority assigned to data associated with that UT 108, a type or category of UT that is indicative of the communication capabilities of that particular UT 108, and so forth. For example, a first UT 108(1) may be a first category of device that has more powerful transmitters, backup power supply, and so forth and may be used in a public safety application. Continuing the example, a second UT 108(2) may be in a second category of device, using less expensive and less powerful transmitters, omitting the backup power supply, and may be used at a residence. The user terminal data 160 may also include information such as a priority allocation associated with a particular UT 108. For example, the first UT 108(1) may be assigned a higher priority relative to the second UT 108(2). Over time, different versions, types, or categories of UTs 108 may be deployed, having different communication capabilities such as being able to operate at particular frequencies, supporting different signal encoding schemes, having different antenna configurations, and so forth.

The handover data 164 is indicative of information such as a UT identifier indicative of a particular UT 108, a handover time indicative of when a handover is to occur, a next satellite identifier (ID) that is indicative of the next satellite 102 that will be providing communication service to the specified UT 108, and so forth. The handover data 164 facilitates an orderly transition of the UT 108 from a first satellite 102(1) to a second satellite 102(2). In some implementations, the handover data 164 may be determined by the management system 150 responsive to current location data. For example, for fixed UTs 108 or MUTs 108(M) that are providing current location data, the management system 150 may determine the handover data 164. In implementations in which the MUT 108(M) obfuscated location data 190 is used, the management system 150 may use the obfuscated location data 190 to determine the handover data 164. In some implementations using the obfuscated location data 190, the MUT 108(M) may determine when handover data 164 is required, and may send a handover request. Responsive to the handover request, the management system 150 or another portion of the system 100 may determine the handover data 164.

While providing communication services to a first set of UTs 108 that may include an MUT 108(M), the resource scheduler 116 of the first satellite 102(1) manages access. This may include managing access by the first set of UTs 108 to one or more of an uplink or a downlink. This management may include, but is not limited to, allocating communication resources of the uplink to the individual UTs 108 in the first set of UTs 108. For example, the first UT 108(1) may request uplink resources to send 50 MB of data, while the MUT 108(M) requests uplink resources to send 1 GB of data, and so forth.

The scheduling system 156 may determine handover data 164 at regular intervals. For example, handover data 164 may be generated for handover assessment intervals that are five seconds long. In other implementations, the handover data 164 may be determined on demand, at irregular intervals, and so forth.

In one implementation, the handover data 164 may involve the scheduling system 156 using the orbital data 154 and the geolocation of the UTs 108 to determine which UTs 108 will be moving out of range of the satellites 102 currently providing communication services to those UTs 108. Based on the orbital data 154 and the geolocation of each UT 108, the next satellite 102 may be determined. For example, this may be a satellite 102 that is already in range, or will be in range, at the handover time. In some implementations, the handover data 164 may include a set of next satellites 102. For example, the handover data 164 may comprise a set of satellite IDs that indicate a primary satellite and a secondary satellite. Continuing the example, the second satellite 102(2) may be designated as the primary satellite expected to begin providing communication service to the UT 108 at the handover time. In the event the satellite 102(2) is unable to allocate resources to provide communication service to the UT 108, exception data indicative of this may be generated and provided to one or more of the network management system 150, a secondary satellite 102(3), the UT 108, or other devices. For example, the second satellite 102(2) may use a UT 108 to relay the exception data to the first satellite 102(1) and the secondary satellite 102(3). The first satellite 102(1) may send the exception data to the UT 108. The secondary satellite 102(3) may then allocate resources to provide communication service to the UT 108, and may subsequently provide the communication service beginning at the handover time.

In implementations utilizing the obfuscated mode, the handover data 164 may be determined by the satellite 102, the management system 150, or a combination thereof. For example, a plurality of the satellites 102 may be operated to provide the allocation of communication resources to the plurality of spots associated with the obfuscated location data 190 and potential future locations of the MUT 108(M).

The satellite 102 providing communication services may manage its uplink by providing grant data 166 to UTs 108. The grant data 166 is indicative of one or more parameters associated with uplink communication between the UT 108 and the satellite 102. For example, the grant data 166 may indicate the uplink frequency, downlink frequency, assigned timeslot, signal encoding, quantity of data permitted to be sent, and forth. In one implementation, the grant data 166 may be generated by the satellite 102. For example, the satellite 102(1) may receive uplink requests and responsive to those uplink requests send grant data 166.

The UT 108 includes a communication system 180 to establish communication with one or more satellites 102 and transfer data. The communication system 180 may comprise a network interface. The UT 108 passes data between the constellation of satellites 102 and the computing device 110. The computing device 110 may execute one or more application modules 196. The data transferred includes upstream data 112 sent by the computing device 110 or downstream data 142 that is addressed to the UT 108 or the computing device 110. For example, during operation the application module 196 may send upstream data 112 and receive downstream data 142. The upstream data 112 and the downstream data 142 each may comprise header data and payload data. The UT 108 may be fixed or in motion. For example, the UT 108 may be used at a residence, business, or on a vehicle such as a car, boat, aerostat, drone, airplane, remotely operated vehicle, uncrewed vehicle, and so forth.

During operation, the communication system 180 may utilize the grant data 166 received from the satellite 102. For example, the UT 108 may request uplink resources to send the upstream data 112. Responsive to the request, the satellite 102 may send grant data 166 allocating uplink resources for the UT 108 to use to send the upstream data 112 to the satellite 102.

The communication system 180 of the UT 108 may include components similar to those of the communication system of a satellite 102 and may perform similar communication functionalities. For example, the communication system 180 may include one or more modems, digital signal processors, power amplifiers, antennas (including at least one antenna that implements multiple antenna elements, such as a phased antenna array), processors, memories, storage devices, communications peripherals, interface buses, and so forth. Continuing the example, the network interface may comprise the communication system 180.

The communication system 180 of the UT 108 may also allow for operation in various modes such as a regular mode, obfuscated mode, whisper mode, quiet mode, and so forth. These modes are described in more detail with regard to FIGS. 3-9. In some implementations the mode used by the communication system 180 may be determined based on data received from the application module 196 or another control input. In other implementations, the mode used by the communication system 180 may be remotely configured, such as upon receiving a control message from the satellite 102 or the management system 150. For example, to further obscure the presence and operation of a particular MUT 108(M) operating in obfuscated mode, the management system 150 may remotely transition several other UTs 108 to operate in obfuscated mode at the same time.

The UT 108 includes a tracking system 182. The tracking system 182 uses ephemeris data 184 to determine tracking data 186. The ephemeris data 184 provides information indicative of orbital elements of the orbit 104 of one or more satellites 102. For example, the ephemeris data 184 may comprise orbital elements such as "two-line element" data for the satellites 102 in the constellation that are broadcast or otherwise sent to the UTs 108 using the communication system 180.

The tracking system 182 may use the current location data indicative of the current location of the UT 108 with high accuracy and the ephemeris data 184 to determine the tracking data 186 for the satellite 102. For example, based on the current location of the UT 108 and the predicted position and movement of the satellites 102, the tracking system 182 is able to calculate the tracking data 186. The tracking data 186 may include information indicative of azimuth, elevation, distance to the second satellite 102(2), time of flight correction, or other information associated with a specified time. The determination of the tracking data 186 may be ongoing. For example, the first UT 108 may determine tracking data 186 every 100 ms, every second, every five seconds, or at other intervals.

With regard to FIG. 1, the uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106.

In some implementations, the satellites 102 may also be in communication with one another. For example, an inter-satellite link (ISL) 198 may provide for communication between satellites 102 in the constellation. In some implementations, the ISL 198 may be used to exchange information between satellites 102 to determine handover data 164, coordinate the handovers of an MUT 108(M) in a plurality of spots that may be served by a plurality of satellites 102, and so forth.

The UT 108 may send upstream data 112 using the system 100. For example, the upstream data 112 may originate from the UT 108, or may be received by the UT 108 from a computing device 110. The upstream data 112 may comprise a single packet or other unit of data transfer, or a plurality of packets or other units of data transfer. The upstream data 112 may be addressed to a device. The device that the upstream data 112 is addressed to may be accessible using one or more networks 144, such as the Internet.

Ground stations 106 may have more substantial communication infrastructure, such as uplink transmitters with greater power than a UT 108, antennas with greater gain than a UT 108, sites that provide clear line of sight from horizon to horizon, and so forth. A ground station 106 may be in communication with a plurality of satellites 102 at a time. In some implementations, the ground station 106 may implement the resource scheduler 116 as described herein.

The system 100 may include one or more point of presence (POP) systems 146. Each POP system 146 may comprise one or more servers or other computing devices. Separate POP systems 146 may be located at different locations. In one implementation, a POP system 146 may be associated with providing service to a plurality of UTs 108 that are located in a particular geographic region.

The POP systems 146 may manage communication between the system 100 and the network 144. For example, a first POP system 146 may receive the upstream data 112 and send that upstream data 112 to the network 144. In another example, the first POP system 146 may receive the downstream data 142 and proceed to attempt delivery of the downstream data 142 to the UT 108.

The POP system 146 is in communication with one or more ground stations 106(1), 106(2), ..., 106(G) and the management system 150. In some implementations one or more functions may be combined. For example, the POP system 146 may perform one or more functions of the management system 150. In another example, the POP system 146 may be included in an integrated ground station 106.

The POP system 146 may determine the UT 108 that the downstream data 142 is addressed to and determine first communication resource data. The first communication resource data specifies the communication resources, such as ground station 106, uplink modem at the ground station 106, satellite 102, downlink modem on the satellite 102, and so forth that would result in delivery of the downstream data 142 to the UT 108. The downstream data 142 may comprise a single packet or other unit of data transfer, or a plurality of packets or other units of data transfer that are associated with delivery to the particular UT 108.

In some implementations, traffic associated with a particular UT 108, such as an MUT 108(M), may be routed through a single network point, such as a master POP, firewall, traffic shaper, and so forth. Downstream data 142 received via one or more ground stations 106 in different physical locations may be forwarded to a master PoP and processed before sending to the network 144. This processing may include removing or replacing packet header data, reordering packets, and so forth. The processing may serve to remove information that would otherwise indicate one or more of the particular ground station 106 or PoP 146 that was used to receive the downstream data 142.

The satellite 102, the ground station 106, the user terminal 108, the computing device 110, the management system 150, the POP system 146, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks 144. For example, the transitory machine-readable signal may comprise transmission of software by the Internet.

Figure 2:
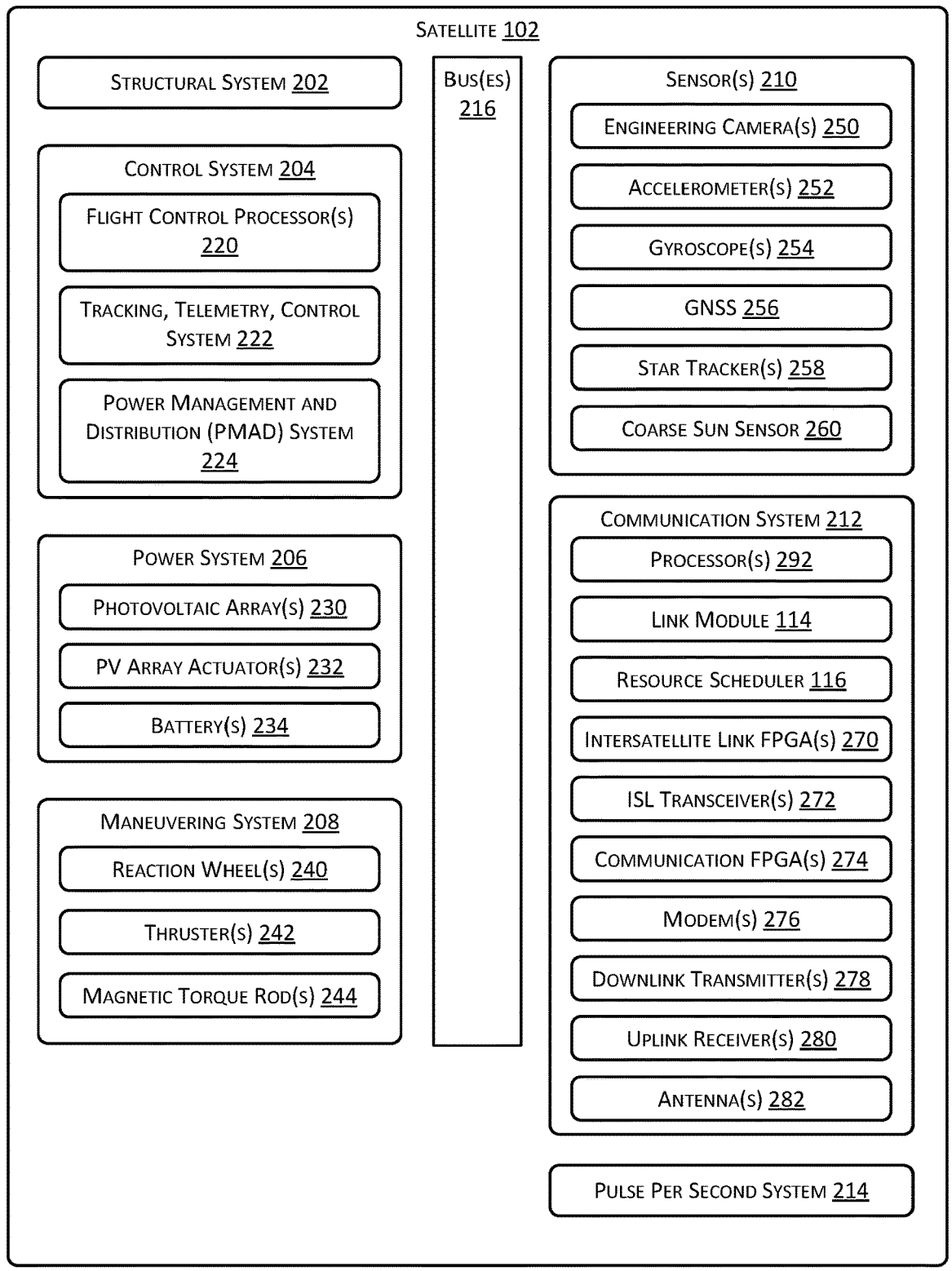
FIG. 2 is a block diagram of some systems associated with the satellite, according to some implementations.

FIG. 2 is a block diagram 200 of some systems associated with the satellite 102, according to some implementations. The satellite 102 may comprise a structural system 202, a control system 204, a power system 206, a maneuvering system 208, one or more sensors 210, and a communication system 212. A pulse per second (PPS) system 214 may be used to provide timing reference to the systems onboard the satellite 102. One or more buses 216 may be used to transfer data between the systems onboard the satellite 102. In some implementations, redundant buses 216 may be provided. The buses 216 may include, but are not limited to, data buses such as Controller Area Network Flexible Data Rate (CAN FD), Ethernet, Serial Peripheral Interface (SPI), and so forth. In some implementations the buses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 212. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more PV array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters 242 may expend propellant. For example, an electrothermal thruster may use water as propellant, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations, the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 212 provides communication with one or more other devices, such as other satellites 102, ground stations 106, user terminals 108, and so forth. The communication system 212 may comprise one or more processors 292 to execute instructions. The communication system 212 may comprise the link module 114 and the resource scheduler 116. In one implementation, the link module 114 may comprise an antenna 282 such as a phased antenna array (PAA) that is capable of simultaneously providing multiple subbeams. A subbeam may be targeted to cover a specified portion of the Earth (including the airspace above that portion) or a "spot" (see FIG. 3) while the satellite 102 is in a particular portion of the orbit 104. For example, the link module 114 may adjust or steer the direction of the subbeam relative to the satellite 102 to keep the subbeam pointed at a target location on the Earth while the satellite 102 is above the horizon and in range of that target location. As the satellite 102 moves out of range of the target location, the subbeam may be retargeted to another target location that is moving into range. The different subbeams on the satellite 102 may be directed to different spots. In another implementation, the subbeam may continuously sweep across the surface of the Earth, such as in a line parallel to a ground track of the satellite 102.

The communication system 212 may include one or more modems 276, digital signal processors, power amplifiers, antennas (including at least one antenna that implements multiple antenna elements, such as a phased antenna array) 282, processors 292, memories, storage devices, communications peripherals, interface buses 216, and so forth. Such components support communications with other satellites 102, ground stations 106, user terminals 108, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 212 may be output to other systems, such as to the control system 204, for further processing. Output from a system, such as the control system 204, may be provided to the communication system 212 for transmission. The modems 276 operate in conjunction with other components, such as receivers, transmitters, and one or more antennas 282 to one or more of send or receive data.

Each satellite 102 may use one or more antennas 282 or antenna elements to provide a beam for transmission and reception of radio signals. For example, the satellite 102 may have a phased antenna array that allows for gain in a particular direction, producing an antenna gain pattern. Compared to a non-directional radiator, this gain directs the energy of transmitted radio frequency signals in that particular direction. This increases the strength of the signal at a receiver in the UT 108, ground station 106, and so forth. Likewise, the gain results in improved received signal strength at the satellite 102.

The beam provided by the satellite 102 may comprise a plurality of subbeams. Subbeams on a satellite 102 may use different frequencies, timeslots, and so forth, to communicate with the UT 108. Each subbeam provides coverage of a particular spot comprising a geographic area. Compared to a single beam, subbeams provide several advantages. For example, by using subbeams, radio frequencies may be reused by the same satellite 102 and other satellites 102 to service different areas. This allows increased density of UTs 108 and bandwidth.

During a pass over of a particular location on the Earth, each subbeam may be targeted to a geographic location on the Earth. While that target spot is in range of the satellite 102, the subbeam tracks the target spot. As the satellite 102 moves in orbit 104, the boundary of the footprint of the subbeam on the surface changes due to the relative angle between the satellite 102 and the Earth. For example, the footprint boundary of the subbeam may change from approximately an oval shape while the satellite 102 is low on the horizon relative to the target location, to a circular shape while directly overhead, then to an oval shape as the satellite 102 nears the opposite horizon. As the satellite 102 moves, a subbeam may be retargeted to another target location. In this configuration, instead of the subbeam sweeping along the ground track of the satellite 102, the subbeam loiters on a first area relative to the Earth, then is redirected to a second area.

In some implementations, a particular modem 276 or set of modems 276 may be allocated to a particular subbeam and the corresponding spot. For example, a first modem 276(1) provides communication to UTs 108 in a first spot using a first subbeam while a second modem 276(2) provides communication to UTs 108 in a second spot using a second subbeam.

In some implementations, the communication system 212 may include hardware to support the intersatellite link 198. For example, an intersatellite link FPGA 270 may be used to modulate data that is sent and received by an ISL transceiver 272 to send data between satellites 102. The ISL transceiver 272 may operate using radio frequencies, optical frequencies, and so forth.

A communication FPGA 274 may be used to facilitate communication between the satellite 102 and the ground stations 106, UTs 108, and so forth. For example, the communication FPGA 274 may direct operation of a modem 276 to modulate signals sent using a downlink transmitter 278 and demodulate signals received using an uplink receiver 280. The satellite 102 may include one or more antennas 282. For example, one or more parabolic antennas may be used to provide communication between the satellite 102 and one or more ground stations 106. In another example, a phased antenna array may be used to provide communication between the satellite 102 and the UTs 108.

The communication system 212 may determine grant data 166 that specifies uplink resources for a UT 108 to communicate with the satellite 102. For example, the communication FPGA 274 may process a grant request that is received from a UT 108 by the uplink receiver 280. Responsive to the grant request, and subject to the resource scheduler 116, the communications FPGA 274 may determine grant data 166 that is then sent using the downlink transmitter 278. In another example, the resource scheduler 116 may determine grant data 166 without a grant request, responsive to the MUT 108(M) operating in one or more of an obfuscated mode, whisper mode, or quiet mode.

Figure 3:
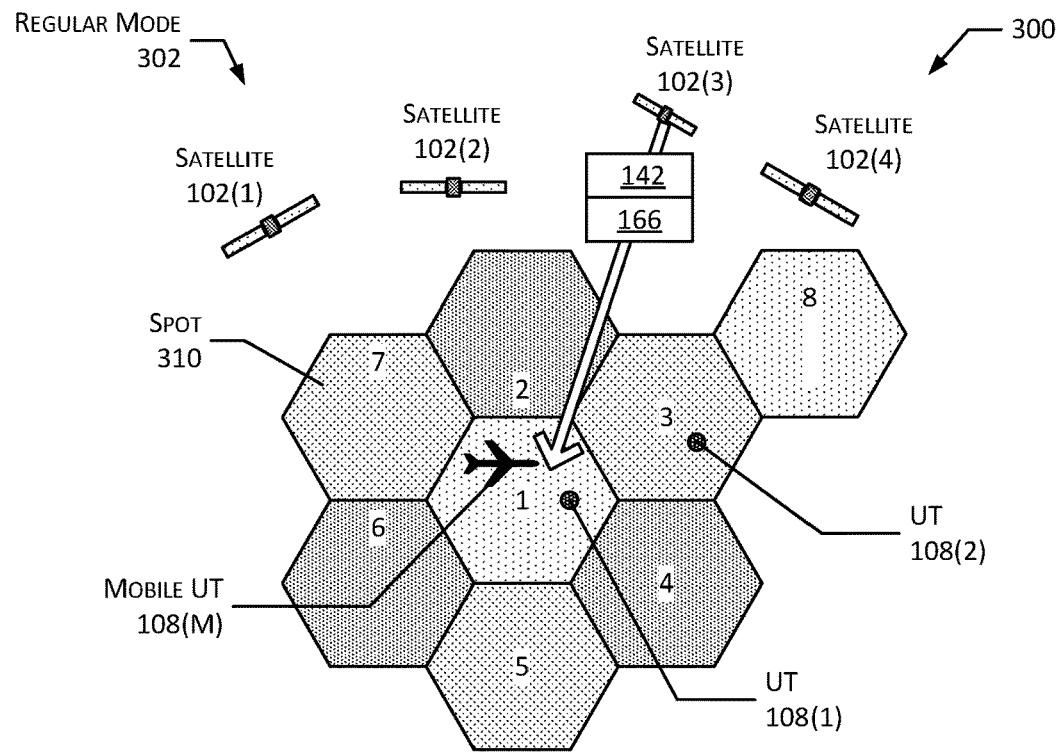
FIG. 3 illustrates spots containing stationary user terminals and a mobile user terminal and their interaction with satellites in a regular mode and an obfuscated mode, according to some implementations.
Figure 3:
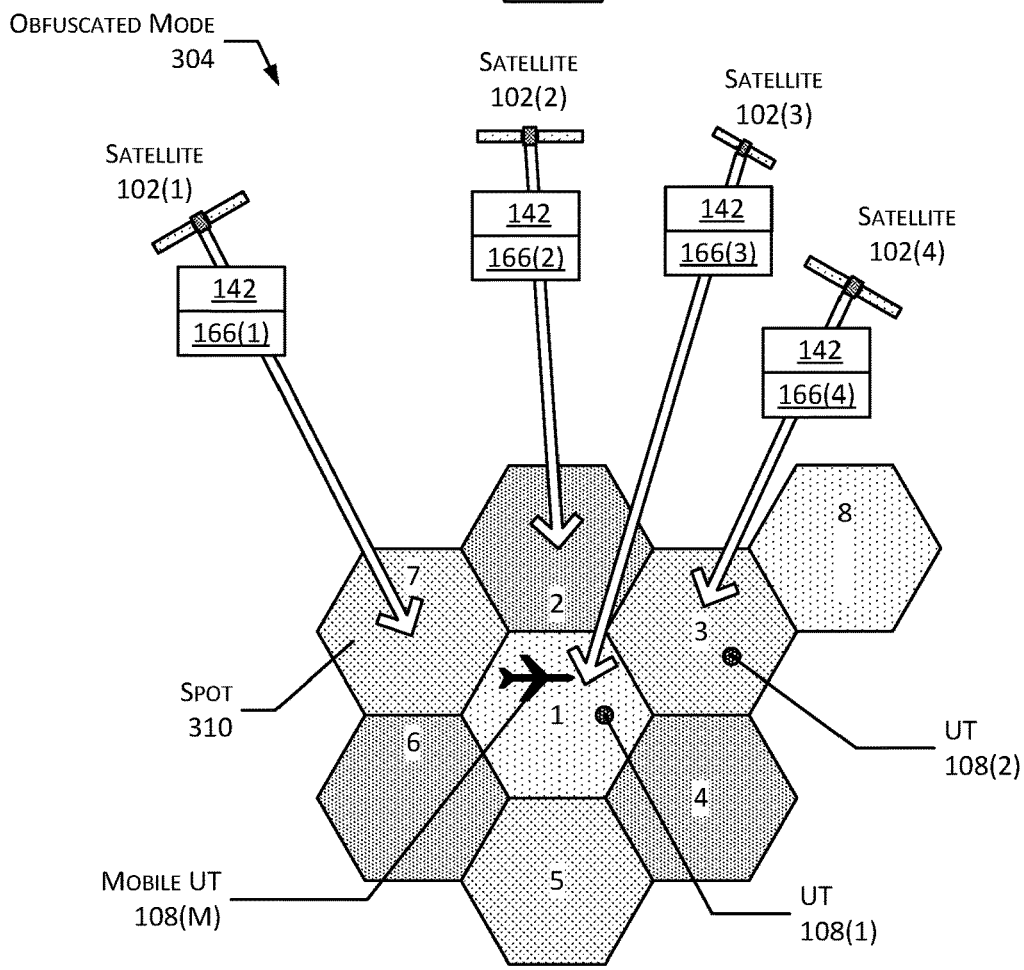

FIG. 3 illustrates at 300 spots containing an MUT 108(M) and operating satellites 102 in a regular mode 302 and an obfuscated mode 304, according to some implementations.

A regular mode is shown at 302. Spots 310 are shown, some containing fixed UTs 108 and a mobile UT 108(M). The relative position of the spots 310 with respect to one another and the satellite 102 are also shown.

A spot 310 may comprise a spatial location, geographic area, and so forth. For example, the spatial location may comprise a portion of an orbit 104, a geographic area may comprise a specified area on Earth, and so forth. In the implementation depicted here, the spot 310 may comprise a geographic area on the Earth and the airspace or volume corresponding with that geographic area. One or more UTs 108 may be present within one or more spots 310.

The spots 310(1), 310(2), ..., 310(S) may be arranged to cover at least a portion of a surface, physical area such as a portion of the sky, and so forth. For example, the Earth may be tessellated into spots 310 that are hexagonal or some other space filling polygon arrangement. In some implementations, a spot 310 may be sized to correspond to a footprint of a subbeam. For example, the spot 310 may comprise an area on the surface of the Earth that corresponds to an uplink subbeam and a downlink subbeam. In implementations in which the spots 310 are directed towards space, each spot 310 is associated with a respective physical area such as a solid angle of the sky, portion of an orbit 104, and so forth.

By way of illustration, and not as a limitation, UT 108(1) is shown at a geographic location that is within the spot 310(1), UT 108(2) is shown at a geographic location that is within the spot 310(3), and an MUT 108(M) is shown at a geographic location that is within the spot 310(1).

While in the regular mode 302, the MUT 108(M) is providing a current location that is indicative of a geolocation of the MUT 108(M) with a relatively high accuracy. While in the regular mode 302, the system 100 allocates communication resources to the current spot 310 that the MUT 108(M) is located within. As shown here, a single satellite 102(3) that is providing service to spot 310(1) at this time is used to send downstream data 142 and is also providing grant data 166 and associated uplink resources to the MUT 108(M).

While not shown for clarity, other UTs 108 also operating in normal mode are similarly provided with communication services for the spot 310 they are located within. As a result, the operation of the system 100 is highly efficient.

In comparison, while in the obfuscated mode 304 the system 100 is overallocated resources associated with a plurality of spots 310. In this example, resources are allocated to the MUT 108(M) for satellite 102(1) serving spot 310(7), satellite 102(2) serving spot 310(2), satellite 102(3) serving spot 310(1), and satellite 102(4) serving spot 310(3). While this overallocation of communication resources reduces the efficiency of the system 100, it provides a substantial reduction in the amount of information associated with operation of the MUT 108(M) that is available to a third party.

In one implementation, the obfuscated location data 190 may indicate a first location of the MUT 108(M), and the current location data is indicative of a second location of the MUT 108(M). There may be a 50% probability that a first distance between the first location and the second location is greater than or equal to a threshold distance, or there is a 50% probability that a second distance between the first location and the second location is less than the threshold distance. In other implementations the percentage of probability may differ.

In another implementation, the obfuscated location data 190 may be based on one or more of: a predetermined plurality of waypoints, a beginning location of the MUT 108(M), an ending location of the MUT 108(M), a first location and associated first direction and first speed, or current time. For example, a flight plan, sailing schedule, overland traverse plan, or other information may be used to determine the plurality of waypoints.

By way of illustration, and not as a limitation, each satellite 102 is depicted as serving a particular spot 310 at the time shown. It is understood that a satellite 102 may service a plurality of spots 310 during a particular time interval. For example, satellite 102(2) may provide communication services to spots 310(1)-(7) while satellite 102(3) provides communication services to spots 310(8)-(15) and so forth.

Figure 4:
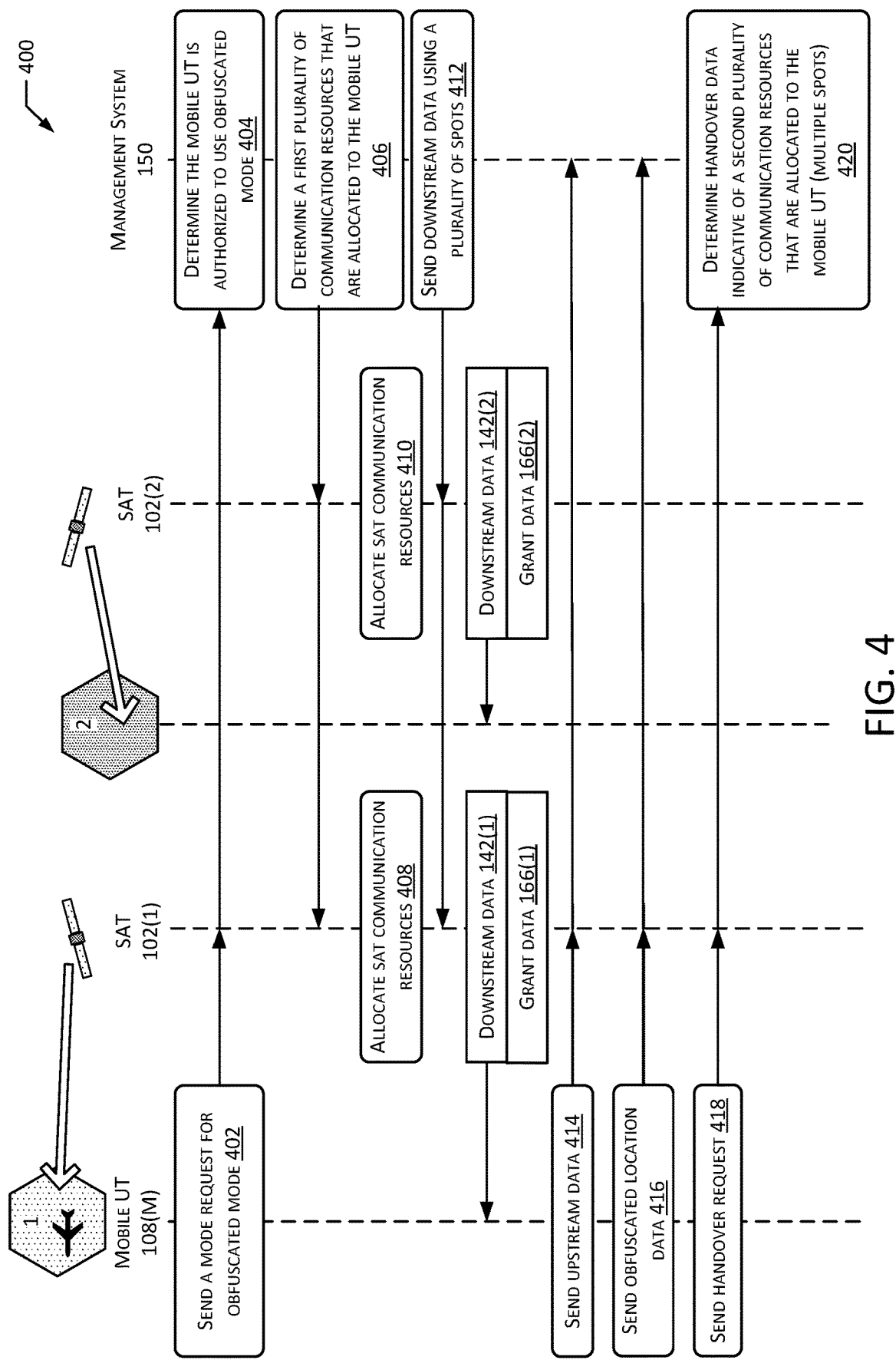
FIG. 4 depicts a flow diagram of a process to provide an obfuscated mode to a mobile user terminal, according to some implementations.

FIG. 4 depicts at 400 a flow diagram of a process to provide an obfuscated mode to a mobile user terminal 108(M), according to some implementations. The process may be implemented by one or more satellites 102, ground stations 106, user terminals 108, the management system 150, and so forth. While in the obfuscated mode, the UT 108 does not provide current location data, and the system 100 obfuscates information about the whereabouts of the UT 108 by allocating communication resources in a plurality of spots 310.

At 402 the mobile UT 108(M) sends a mode request 188 for obfuscated mode. The mobile UT 108(M) in this illustration is located within spot 310(1) that is currently serviced by satellite 102(1). For example, the mobile UT 108(M) may perform an initial network entry (INE) process that requests network entry and includes the mode request 188 for the obfuscated mode. The satellite 102(1) receives the mode request 188 and determines if the mode request 188 is valid. In this illustration, the satellite 102(1) may communicate with the management system 150 to make this determination. In some implementations, the mobile UT 108(M) may send obfuscated location data 190 (not shown). In other implementations, the obfuscated location data 190 may be inferred based on the spot 310 the mode request 188 was received via. In yet another implementation the obfuscated location data 190 may be predetermined.

At 404 the management system 150 determines that the mobile UT 108(M) is authorized to use obfuscated mode. For example, a device identifier associated with the mobile UT 108(M) and one or more encrypted credentials may be verified and compared to a list of UTs 108 to determine which operating modes are permitted.

At 406 the management system 150, or a portion thereof such as the scheduling system 156 may allocate a first plurality of communication resources to the mobile UT 108(M). For example, the first plurality of communication resources may comprise a plurality of satellites 102 that are a subset of the constellation. In some implementations, the management system 150 may send a message to the plurality of satellites 102 that is indicative of approval to provide the obfuscated mode to the mobile UT 108(M) and resource allocation may be performed locally, such as by the resource scheduler 116 onboard each respective satellite 102.

At 408 the first satellite 102(1) allocates satellite communication resources 408 for use by the mobile UT 108(M). These communication resources 408 may include access to the uplink and downlink of one or more spots 310 serviced by the first satellite 102(1), such as spot 310(1) as shown here.

At 410 the second satellite 102(2) also allocates satellite communication resources 410 for use by the mobile UT 108(M). These communication resources 410 may include access to the uplink and downlink of one or more spots 310 serviced by the second satellite 102(2), such as spot 310(2) as shown here. At the time shown in this illustration, the mobile UT 108(M) is not located within spot 310(2). Communication resources have been intentionally overallocated to the mobile UT 108(M).

At 412 downstream data 142 that is addressed to the mobile UT 108(M) is sent, by the management system 150 or other portion of the system 100, to the plurality of satellites 102 that are indicated by the first plurality of communication resources.

In this illustration, the first satellite 102(1) and the second satellite 102(2) receive the downstream data 142 that is addressed to the mobile UT 108(M). Each satellite 102 sends the downstream data 142 to the respective spots 310 that they respectively service. The first satellite 102(1) sends the downstream data 142(1) to the first spot 310(1). The second satellite 102(2) sends the downstream data 142(2) to the second spot 310(2). In some implementations, the payload of the downstream data 142(1) may be identical to the payload of the downstream data 142(2). The header data of the respective downstream data 142 may vary as needed to maintain communication.

The first satellite 102(1) may also send first grant data 166(1). The first grant data 166(1) is indicative of the communication resources that have been allocated to provide uplink access to the mobile UT 108(M) on the uplink to the first satellite 102(1) while in the first spot 310(1).

The second satellite 102(2) may also send second grant data 166(2). The second grant data 166(2) is indicative of the communication resources that have been allocated to provide uplink access to the mobile UT 108(M) on the uplink to the second satellite 102(2) while in the second spot 310(2). As with the downlink resources, the uplink resources have been intentionally overallocated to the mobile UT 108(M). The mobile UT 108(M) will typically be present only in a single spot 310 at any given time. In some situations, at a border between spots 310, the mobile UT 108(M) may be deemed to be in any of the spots 310 for which communication coverage overlaps.

At 414 the MUT 108(M) sends upstream data 112 to the first satellite 102(1). The mobile UT 108(M) may use the grant data 166(1) associated with the first satellite 102(1) to send the upstream data 112. The first satellite 102(1) may then send the upstream data 112 to a designated destination, such as to a device on the network 144.

At 416 the MUT 108(M) sends obfuscated location data 190. In one implementation, the obfuscated location data 190 may be determine by the MUT 108(M). For example, the current location data provided by a GNSS system, inertial navigation, or other system may be randomized, hashed, varied, or otherwise modified to determine the obfuscated location data 190.

In some implementations, the obfuscated location data 190 may comprise a waypoint identifier that is indicative of a predetermined waypoint specifying a geolocation of a waypoint associated with a flight plan, sailing route, land navigation route, and so forth. Based on the waypoint identifier a plurality of spots 310 may be determined. In another implementation, the obfuscated location data 190 may be determined based on previously stored geolocation data and based on current time. For example, based on a flight plan and given a realtime clock time, obfuscated location data 190 associated with a particular waypoint that is associated with a particular time may be retrieved.

In one implementation, at 418 the MUT 108(M) may send a handover request. The handover request may comprise information that is used by the management system 150, resource scheduler 116, or other portions of the system 100 to determine handover data 164. The handover request may comprise one or more of the obfuscated location data 190, data indicative of an obfuscated direction of travel, obfuscated speed of travel, a plurality of spots 310 that the MUT 108(M) may be located within, time of handover, and so forth. For example, the handover request may specify a time of the handover and a list of spots 310 that the MUT 108(M) may be in as of that time, such as "{time: 211100,spots: 2,3,4,8,11}".

The handover request may be sent using the previously provided grant data 166(1) for the spot 310(1) that the MUT 108(M) currently is located within.

In comparison, during normal mode the MUT 108(M) may send current location data, and based on the current location data the management system 150, the resource scheduler 116, or other portions of the system 100 determines handover data 164 to a single specified spot 310.

At 420 handover data 164 indicative of a second plurality of communication resources is determined. The second plurality of communication resources may be indicative of a plurality of spots 310 and associated satellites 102 as of a specified handover time. In one implementation, the handover data 164 may be determined in response to the handover request sent at 418. In another implementation, the handover data 164 may be determined in response to previously provided obfuscated location data 190. For example, based on a flight plan and given a realtime clock time, obfuscated location data 190 associated with a particular waypoint that is associated with a particular time may be retrieved and used to determine the handover data 164.

As described above, information about the second plurality of communication resources may be sent to the associated satellites 102, allowing uninterrupted communication with the MUT 108(M).

Figure 5:
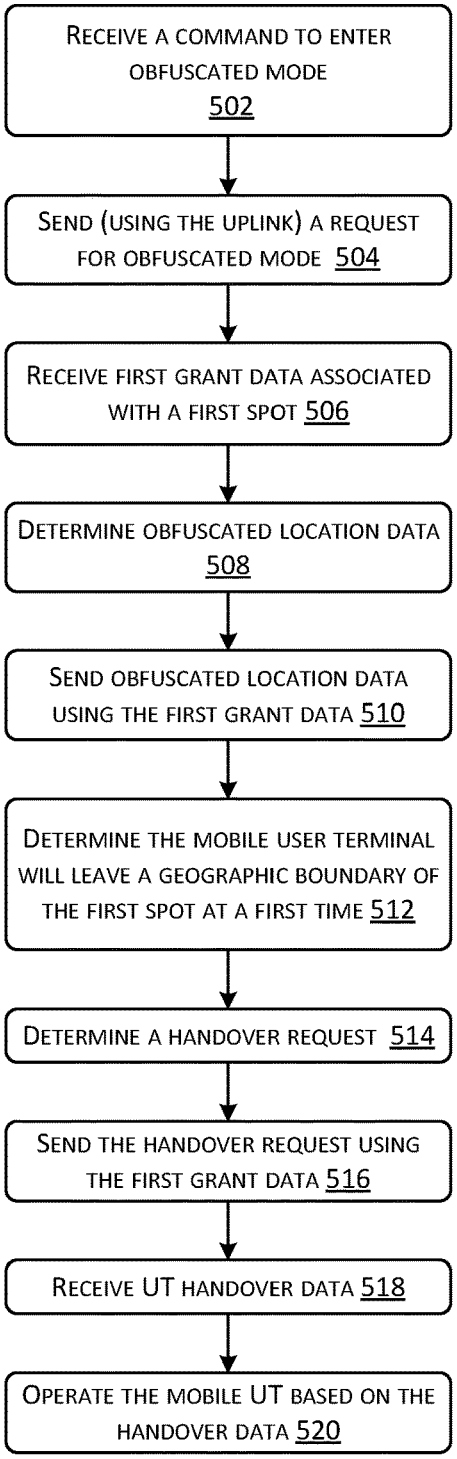
FIG. 5 depicts a flow diagram of a process to operate a mobile user terminal in an obfuscated mode, according to some implementations.

FIG. 5 depicts at 500 a flow diagram of a process to operate a mobile user terminal 108(M) in an obfuscated mode, according to some implementations. The process may be implemented at least in part by one or more of the UTs 108(1)-(M).

At 502 a command to enter obfuscated mode is received by the UT 108. For example, a computing device 110 may send the command to enter the obfuscated mode. In another example, the command to enter the obfuscated mode may be received via the UT 108. Continuing this example, the command to enter the obfuscated mode may be received from the satellite 102, the management system 150, or other system. In some implementations it may be advantageous to operate a plurality of UTs 108 in obfuscated mode, even UTs 108 that are stationary, to obfuscate the operation of a particular MUT 108(M).

At 504 a request for obfuscated mode is sent. For example, the MUT 108(M) may use the uplink to send a mode request 188 for obfuscated mode.

At 506 first grant data 166 associated with a first spot 310(1) is received.

At 508 obfuscated location data 190 is determined. One or more techniques may be used to determine the obfuscated location data 190. The current location data is associated with a first accuracy of a reported position relative to a ground truth or absolute position. For example, the current location data may comprise information about a particular MUT 108(M) that is accurate (relative to a specified reference datum) to less than a specified threshold, such as 10 meters. In contrast, the obfuscated location data 190 is associated with a second accuracy that is less than the first accuracy of the current location data. For example, the second accuracy of the obfuscated location data 190 may indicate the location of the particular MUT 108(M) at between 50 km and 1000 km.

In one implementation, based on current location data, a set of spots 310 are determined. For example, the current location data may be compared to previously stored information about the geographic boundaries of the spots 310 provided by the system 100. Given the current location data, the spot 310 that the MUT 108(M) currently is located within may be determined. A random number generator or other algorithm may be used to determine a plurality of other spots 310. In some implementations these may be spots 310 that are contiguous with, or adjacent to, the spot 310 that the MUT 108(M) is currently located within. However, the relative placement of the spot 310 the MUT 108(M) is currently located in may be varied. For example, the set of spots 310 may comprise an approximately oval shape, with the spot 310 the MUT 108(M) is current located within being anywhere within that oval.

At 510 the obfuscated location data 190 is sent. For example, the obfuscated location data 190 may be sent to the satellite 102 using the first grant data 166.

At 512 the MUT 108(M) determines it will leave a geographic boundary of the first spot at a first time. For example, based on a comparison of the current location data (which has not been transmitted to the remainder of the system 100) and the previously stored information about the geographic boundaries of the spots 310, the MUT 108(M) determines the MUT 108(M) will be crossing into a second spot 310 at the first time.

At 514 the MUT 108(M) determines a handover request. For example, the MUT 108(M) may determine the handover request comprising the set of spots and the handover time indicative of the first time, when the MUT 108(M) will cross into the second spot 310.

At 516 the handover request is sent. For example, the handover request may be sent to the satellite 102 using the first grant data 166.

At 518 the MUT 108(M) receives handover data 164. For example, the handover data 164 may comprise information indicative of the communication resources in a plurality of spots 310 that have been allocated to the MUT 108(M) for use.

At 520, the MUT 108(M) is operated based on the handover data 164. For example, as the MUT 108(M) crosses the boundary of the first spot 310 into the second spot 310, the MUT 108(M) uses the communication resources specified in the handover data 164 to maintain communication.

In some situations, the MUT 108(M) may not be allocated grant data 166, or may have moved into a spot 310 for which grant data 166 was not previously provided. In these situations, the MUT 108(M) may perform an initial network entry process to request access to the network 144, in lieu of the use of previously issued grant data 166.

As mentioned elsewhere, the order in which the operations indicated above are performed may vary. For example, the obfuscated location data 190 may be included with the sending of the mode request 188 to enter the obfuscated mode. Also, some operations may be omitted. For example, operations 510-516 may be omitted in implementations where the obfuscated location data 190 is previously specified or is provided by another device. Continuing the example, a predetermined flight plan may be used to determine the obfuscated location data 190 without received information from the MUT 108(M).

Figure 6:
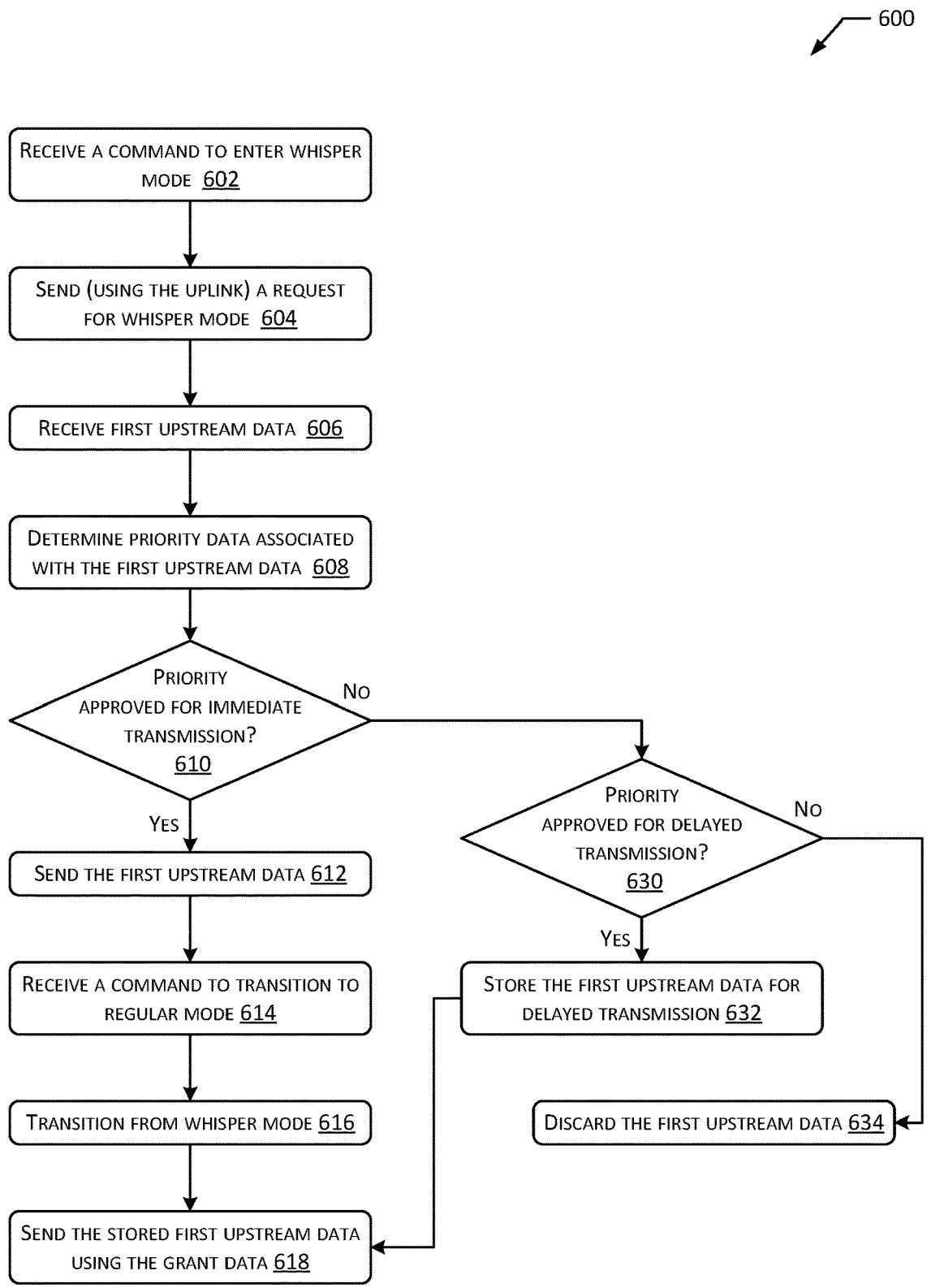
FIG. 6 depicts a flow diagram of a process to operate a mobile user terminal in a whisper mode, according to some implementations.

FIG. 6 depicts at 600 a flow diagram of a process to operate a mobile user terminal 108(M) in a whisper mode, according to some implementations. The process may be implemented at least in part by one or more of the UTs 108(1)-(M). The whisper mode may be operated in conjunction with the obfuscation mode as described above. While in the whisper mode, the UT 108 will attempt to minimize the transmission of upstream data 112.

At 602 a command to enter whisper mode is received by the UT 108. For example, a computing device 110 may send the command to enter the whisper mode. In another example, the command to enter the whisper mode may be received via the UT 108. Continuing this example, the command to enter the whisper mode may be received from the satellite 102, the management system 150, or other system. In some implementations, it may be advantageous to operate a plurality of UTs 108 in whisper mode, even UTs 108 that are stationary, to obfuscate the operation of a particular MUT 108(M).

At 604 a request for whisper mode is sent. For example, the MUT 108(M) may use the uplink to send a mode request 188 for whisper mode.

At 606 the UT 108 receives first upstream data 112 for transmission to the satellite 102(1). For example, the application modules 196 executing on the computing devices 110 may generate the first upstream data 112 for transmission.

At 608 priority data associated with the first upstream data 112 is determined. The priority data is indicative of a priority that is used to determine whether the first upstream data 112 is to be discarded, stored for delayed transmission, or sent without delay. The priority data may be determined based on one or more of the originating application module 196, header data of the upstream data 112, length of the payload data, type of payload data, and so forth. For example, application modules 196 associated with the navigation and piloting of a vehicle to which the MUT 108(M) is attached may be given a highest priority that is associated with sending without delay. In another example, upstream data 112 comprising routine acknowledgements of received packets may be delayed.

At 610 a determination is made as to whether the first upstream data 112 is associated with a priority approved for immediate transmission. If yes, the process proceeds to 612.

At 612 the first upstream data 112 that has been determined to have a priority approved for immediate transmission is sent.

At a later time, at 614 a command to transition from whisper mode is received. For example, the computing device 110 may send the command to discontinue whisper mode and resume obfuscated mode without the whisper mode.

At 616, responsive to the command, the UT 108 transitions from whisper mode.

At 618, the stored first upstream data 112 that was delayed may be sent. For example, the stored first upstream data 112 may be sent using grant data 166 received from the satellite 102 currently providing service to the spot 310 the UT 108 is located within.

Returning to 610, if the first upstream data 112 does not have a priority approved for immediate transmission, the process proceeds to 630. At 630 a determination is made as to whether the first upstream data 112 is approved for delayed transmission or not. If yes, the process proceeds to 632. If not, the process proceeds to 634.

At 632 the first upstream data 112 is stored for delayed transmission. The process may then proceed to 618 where this previously stored first upstream data 112 is sent.

At 634 the first upstream data 112 that is not stored for delayed transmission may be discarded.

In some implementations, the UT 108 may provide responses to the application modules 196 in place of an external device such as a device on the network 144. This functionality may allow application modules 196 to continue to operate given that some upstream data 112 may be delayed or discarded.

Figure 7:
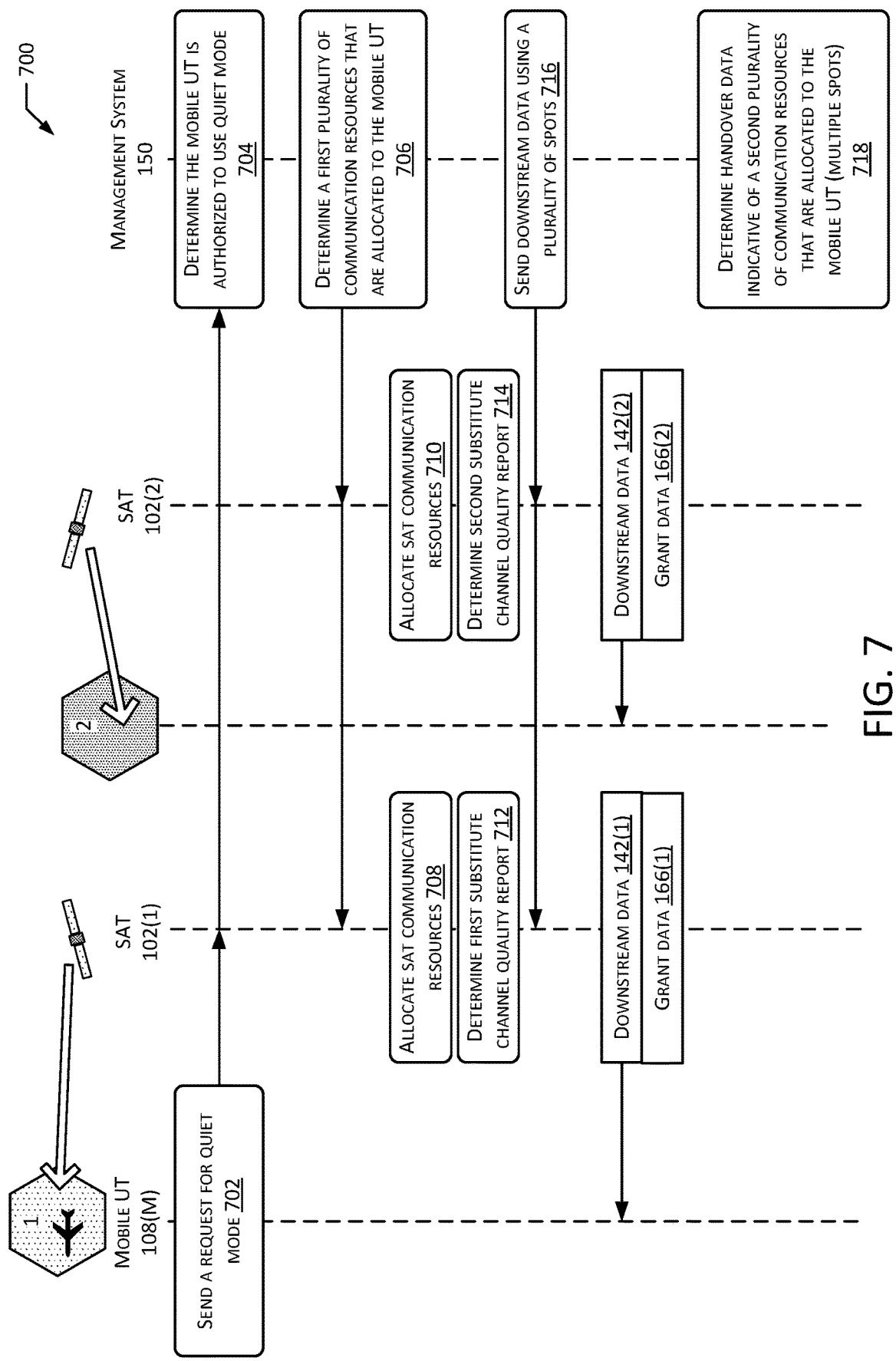
FIG. 7 depicts a flow diagram of process to provide a quiet mode to a mobile user terminal, according to some implementations.

FIG. 7 depicts at 700 a flow diagram of a process to provide a quiet mode to a mobile user terminal, according to some implementations. The process may be implemented by one or more satellites 102, ground stations 106, user terminals 108, the management system 150, and so forth. The quiet mode may be operated in conjunction with the obfuscation mode as described above. While in the quiet mode, the UT 108 may be operated to receive only. While in quiet mode, transmission of upstream data 112 by the UT 108 is not precluded by the satellite 102 and grant data 166 may be provided.

At 702 the mobile UT 108(M) sends a mode request 188 for quiet mode. The mobile UT 108(M) in this illustration is located within spot 310(1) that is currently serviced by satellite 102(1). For example, the mobile UT 108(M) may perform an initial network entry (INE) process that requests network entry and includes the mode request 188 for the quiet mode. The satellite 102(1) receives the mode request 188 and determines if the mode request 188 is valid. In this illustration, the satellite 102(1) may communicate with the management system 150 to make this determination. In some implementations, the mobile UT 108(M) may send obfuscated location data 190 (not shown). In other implementations, the obfuscated location data 190 may be inferred based on the spot 310 the mode request 188 was received via. In yet another implementation the obfuscated location data 190 may be predetermined.

At 704 the management system 150 determines that the mobile UT 108(M) is authorized to use quiet mode. For example, a device identifier associated with the mobile UT 108(M) and one or more encrypted credentials may be verified and compared to a list of UTs 108 to determine which operating modes are permitted.

At 706 the management system 150, or a portion thereof such as the scheduling system 156 may allocate a first plurality of communication resources to the mobile UT 108(M). For example, the first plurality of communication resources may comprise a plurality of satellites 102 that are a subset of the constellation. In some implementations, the management system 150 may send a message to the plurality satellites 102 that is indicative of approval to provide the quiet mode to the mobile UT 108(M) and resource allocation may be performed locally, such as by the resource scheduler 116 onboard each respective satellite 102.

At 708 the first satellite 102(1) allocates satellite communication resources 708 for use by the mobile UT 108(M). These communication resources 708 may include access to the uplink and downlink of one or more spots 310 serviced by the first satellite 102(1), such as spot 310(1) as shown here.

At 710 the second satellite 102(2) also allocates satellite communication resources 710 for use by the mobile UT 108(M). These communication resources 710 may include access to the uplink and downlink of one or more spots 310 serviced by the second satellite 102(2), such as spot 310(2) as shown here. At the time shown in this illustration, the mobile UT 108(M) is not located within spot 310(2). Communication resources have been intentionally overallocated to the mobile UT 108(M).

During operation of the system 100 in which the UTs 108 are sending upstream data 112, the upstream data 112 may comprise channel quality reports (CQRs) or other information that is indicative of the state of the link between the satellite 102 and the particular UT 108. The CQR may comprise information such as the signal strengths on particular channels, data indicative of signal fade, error rates, and so forth. During typical operation, the CQR may be used to specify the modulation coding scheme (MCS) used by the satellite 102 to send the downstream data 142. By using the CQR, data throughput is improved as the satellite 102 is able to maximize throughput given current conditions. For example, in extreme conditions such as where the UT 108 is located within a heavy rainstorm and is experiencing substantial rain fade, the CQR may be used by the link module 114 to select a first MCS that has a lower data throughput rate but still maintains data transmission. In comparison, under clear conditions with no interference, the CQR may be used by the link module 114 to select a second MCS that has a substantially greater data throughput rate.

While operating in quiet mode, the CQR data associated with the MUT 108(M) is unavailable, as the MUT 108(M) is not sending upstream data 112 that includes the CQR data.

At 712 a first substitute CQR is determined that is associated with the first spot 310(1). In one implementation, the first satellite 102(1) may determine the first substitute CQR based on the CQR data obtained from other UTs 108 located within the first spot 310(1). For example, a plurality of the CQR data associated with the first spot 310(1) may be analyzed to determine the CQR data indicative of worst performance. This worst performing CQR data may then be selected for use as the first substitute CQR. In another implementation, the first substitute CQR may be a predetermined value.

At 714 a second substitute CQR is determined that is associated with the second spot 310(2). In one implementation, the second satellite 102(2) may determine the second substitute CQR based on the CQR data obtained from other UTs 108 located within the second spot 310(2). For example, a plurality of the CQR data associated with the second spot 310(2) may be analyzed to determine the CQR data indicative of worst performance. This worst performing CQR data may then be selected for use as the second substitute CQR. In another implementation, the second substitute CQR may be a predetermined value.

At 716 downstream data 142 that is addressed to the mobile UT 108(M) is sent, by the management system 150 or other portion of the system 100, to the plurality of satellites 102 that are indicated by the first plurality of communication resources.

In this illustration, the first satellite 102(1) and the second satellite 102(2) receive the downstream data 142 that is addressed to the mobile UT 108(M). Each satellite 102 sends the downstream data 142 to the respective spots 310 that they respectively service using the respective substitute CQR.

The first satellite 102(1) sends the downstream data 142(1) to the first spot 310(1) using the first substitute CQR. The second satellite 102(2) sends the downstream data 142(2) to the second spot 310(2) using the second substitute CQR. In some implementations, the payload of the downstream data 142(1) may be identical to the payload of the downstream data 142(2). The header data of the respective downstream data 142 may vary as needed to maintain communication.

The first satellite 102(1) may also send first grant data 166(1). The first grant data 166(1) is indicative of the communication resources that have been allocated to provide uplink access to the mobile UT 108(M) on the uplink to the first satellite 102(1) while in the first spot 310(1).

The second satellite 102(2) may also send second grant data 166(2). The second grant data 166(2) is indicative of the communication resources that have been allocated to provide uplink access to the mobile UT 108(M) on the uplink to the second satellite 102(2) while in the second spot 310(2).

The allocation of grant data 166 to the UT 108 while in quiet mode reduces the latency associated with sending upstream data 112, as specified by the UT 108, on the uplink. In other implementations, the grant data 166 may be omitted.

As with the downlink resources, the uplink resources have been intentionally overallocated to the mobile UT 108(M). The mobile UT 108(M) will typically be present only in a single spot 310 at any given time. In some situations, at a border between spots 310, the mobile UT 108(M) may be deemed to be in any of the spots 310 for which communication coverage overlaps.

At 718 handover data 164 indicative of a second plurality of communication resources is determined. The second plurality of communication resources may be indicative of a plurality of spots 310 and associated satellites 102 as of a specified handover time. In one implementation, the handover data 164 may be determined in response to previously provided obfuscated location data 190. For example, based on a flight plan and given a realtime clock time, obfuscated location data 190 associated with a particular waypoint that is associated with a particular time may be retrieved and used to determine the handover data 164.

As described above, information about the second plurality of communication resources may be sent to the associated satellites 102, allowing uninterrupted communication with the MUT 108(M).

Figure 8:
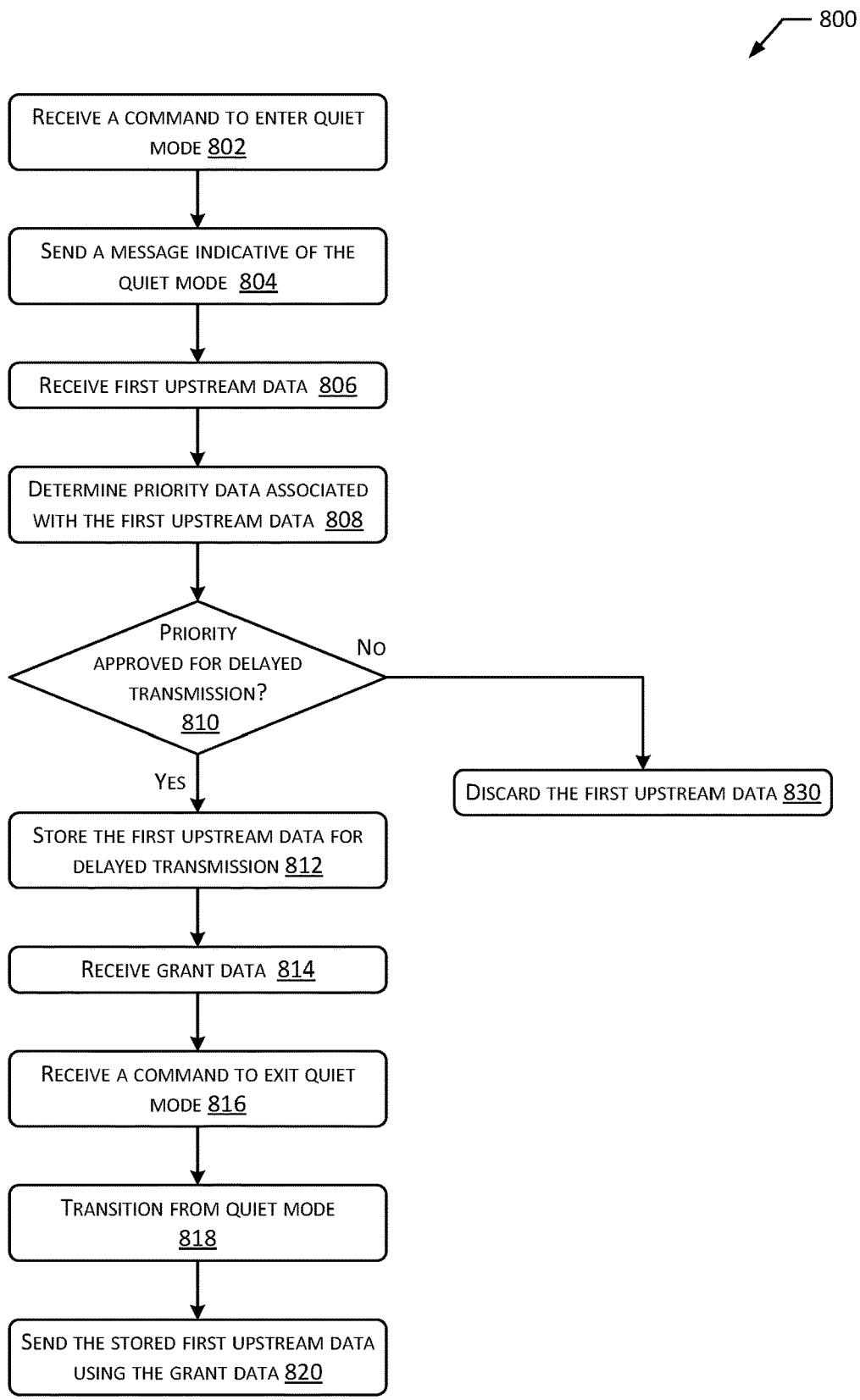
FIG. 8 depicts a flow diagram of a process to operate a mobile user terminal in a quiet mode, according to some implementations.

FIG. 8 depicts at 800 a flow diagram of a process to operate a mobile user terminal 108(M) in a quiet mode, according to some implementations. The process may be implemented at least in part by one or more of the UTs 108(1)-(M). The quiet mode may be operated in conjunction with the obfuscation mode as described above. While in the quiet mode, the UT 108 may be operated to receive only. While in quiet mode, transmission of upstream data 112 by the UT 108 is not precluded by the satellite 102 and grant data 166 may be provided.

At 802 a command to enter quiet mode is received by the UT 108. For example, a computing device 110 may send the command to enter the quiet mode. In another example, the command to enter the quiet mode may be received via the UT 108. Continuing this example, the command to enter the quiet mode may be received from the satellite 102, the management system 150, or other system. In some implementations, it may be advantageous to operate a plurality of UTs 108 in quiet mode, even UTs 108 that are stationary, to obfuscate the operation of a particular MUT 108(M).

At 804 a request for quiet mode is sent. For example, the MUT 108(M) may use the uplink to send a mode request 188 for quiet mode.

At 806 the UT 108 receives first upstream data 112 for transmission to the satellite 102(1). For example, the application modules 196 executing on the computing devices 110 may generate the first upstream data 112 for transmission.

At 808 priority data associated with the first upstream data 112 is determined. The priority data is indicative of a priority that is used to determine whether the first upstream data 112 is to be discarded or stored for delayed transmission. The priority data may be determined based on one or more of the originating application module 196, header data of the upstream data 112, length of the payload data, type of payload data, and so forth. For example, application modules 196 associated with acquiring remote sensing data may be given a priority allowing delayed transmission. In another example, upstream data 112 comprising routine acknowledgements of received packets may not be approved for delayed transmission.

At 810 a determination is made as to whether the first upstream data 112 is associated with a priority approved for delayed transmission. If yes, the process proceeds to 812.

At 812 the first upstream data 112 that has been determined to have a priority approved for delayed transmission is stored for later transmission.

At 814 grant data 166 is received.

At a later time, at 816 a command to transition from quiet mode is received. For example, the computing device 110 may send the command to discontinue quiet mode and resume obfuscated mode without the quiet mode.

At 818, responsive to the command, the UT 108 transitions from quiet mode.

At 820, the stored first upstream data 112 that was delayed may be sent. For example, the stored first upstream data 112 may be sent using grant data 166 received from the satellite 102 currently providing service to the spot 310 the UT 108 is located within.

Returning to 810, if the first upstream data 112 does not have a priority approved for delayed transmission the process proceeds to 830. At 830 the first upstream data 112 that is not stored for delayed transmission may be discarded.

In some implementations, the UT 108 may provide responses to the application modules 196 in place of an external device such as a device on the network 144. This functionality may allow application modules 196 to continue to operate given that some upstream data 112 may be delayed or discarded.

Figure 9:
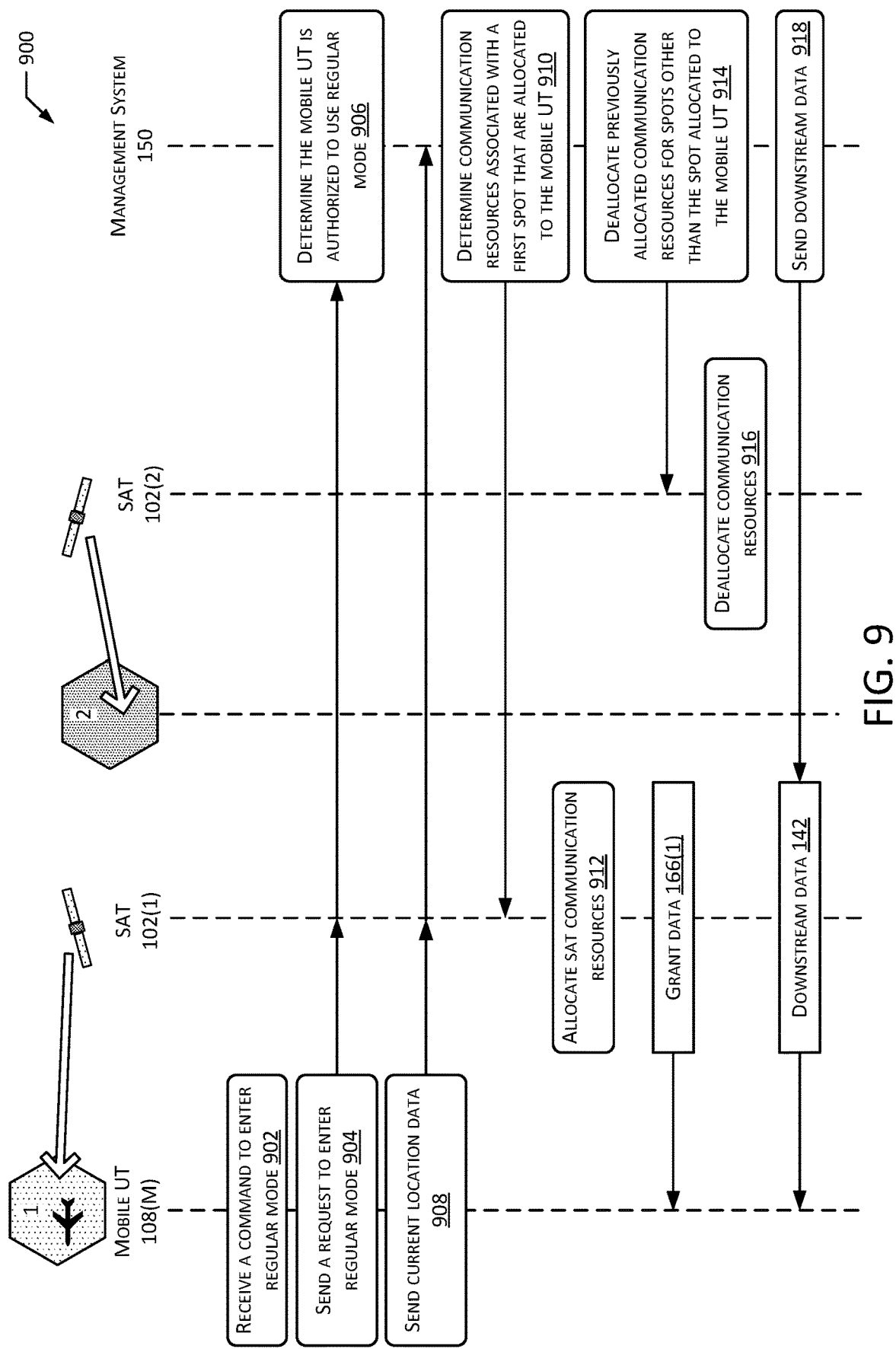
FIG. 9 depicts a flow diagram of a process to transition a mobile user terminal to a regular mode, according to some implementations.

FIG. 9 depicts at 900 a flow diagram of a process to transition a mobile user terminal 108(M) to a regular mode, according to some implementations. The process may be implemented by one or more satellites 102, ground stations 106, user terminals 108, the management system 150, and so forth. While in the normal mode, the UT 108 provides current location data, and the system 100 allocates communication resources based on the current location data minimizing or eliminating overallocation of communication resources.

At 902 a command to enter regular mode is received by the UT 108. For example, a computing device 110 may send the command to enter the regular mode. In another example, the command to enter the regular mode may be received via the UT 108. Continuing this example, the command to enter the regular mode may be received from the satellite 102, the management system 150, or other system.

At 904 a request for regular mode is sent. For example, the MUT 108(M) may use the uplink to send a mode request 188 for regular mode.

At 906 the management system 150 determines that the mobile UT 108(M) is authorized to use regular mode. For example, a device identifier associated with the mobile UT 108(M) and one or more encrypted credentials may be verified and compared to a list of UTs 108 to determine which operating modes are permitted.

At 908 the MUT 108(M) sends current location data. For example, the current location data may be obtained from a GNSS, inertial navigation system, or other system.

At 910 the management system 150, or a portion thereof such as the scheduling system 156 may allocate communication resources to the mobile UT 108(M). For example, the communication resources may indicate a particular satellite 102 and spot 310 that the MUT 108(M) is located within.

At 912 the first satellite 102(1) allocates satellite communication resources for use by the mobile UT 108(M). These communication resources may include access to the uplink and downlink of a spot 310 serviced by the first satellite 102(1), such as spot 310(1) as shown here.

The first satellite 102(1) may also send first grant data 166(1). The first grant data 166(1) is indicative of the communication resources that have been allocated to provide uplink access to the mobile UT 108(M) on the uplink to the first satellite 102(1) while in the first spot 310(1).

At 914, the management system 150 or other portion of the system 100, directs to the plurality of satellites 102 that were previously providing the obfuscated mode to the MUT 108(M), instructions to deallocate previously allocated communication resources for spots 310 other than the one that the MUT 108(M) is currently located within. For example, the management system 150 sends instructions to the second satellite 102(2) to deallocate communication resources previously associated with the MUT 108(M).

At 916 the second satellite 102(2) deallocates communications resources previously associated with the MUT 108(M). For example, the resource scheduler 116 may cancel all previously issued grant data 166 and previously allocated downlink resources.

In some implementations, the allocation of communications may have an expiration time, and may be deallocated as a result of this expiration.

In some situations, such as associated with a handover, communication resources may be allocated in multiple spots 310, such as for a current spot 310 and one or more estimated or predicted future spots 310 to provide continuous coverage as the MUT 108(M) moves from one spot 310 to another.

At 918 downstream data 142 that is addressed to the mobile UT 108(M) is sent, by the management system 150 or other portion of the system 100, to the first satellite 102(1) that is indicated by the communication resources specified at 910. The first satellite 102(1) in turn sends the downstream data 142 to the MUT 108(M).

Times, intervals, durations, and the like as used in this disclosure may be specified with respect to actual clock time, system time, system timing references, discrete timeslots or interval indicators, and so forth. For example, time ticks may be specified relative to an epoch that resets at 10-minute intervals. In another example, actual clock time obtained from a Global Position System receiver may be used to coordinate operation of one or more elements of the system 100.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   determining first location data indicative of a first location of a first user terminal (UT), wherein the first location is associated with second location data indicative of a second location of the first UT and the first location data is less accurate than the second location data;
   determining, based on the first location data, a first plurality of geographic areas associated with communication service by a constellation of satellites;
   determining a first plurality of communication resources, wherein each instance of the first plurality of communication resources is associated with a respective one of the first plurality of geographic areas;
   operating a first plurality of satellites of the constellation, wherein each of the first plurality of satellites allocates a communication resource from among the first plurality of communication resources for communication with the first UT; and
   sending first downstream data that is addressed to the first UT to the first plurality of geographic areas using respective ones of the first plurality of satellites.

2. The method of claim 1, wherein the determining the first plurality of geographic areas comprises:
   determining the first plurality of geographic areas that is within a threshold distance of the first location, wherein the first plurality of geographic areas is contiguous.

3. The method of claim 1, wherein:
   there is a 50% probability that a first distance between the first location and the second location is greater than or equal to a threshold distance; or
   there is a 50% probability that a second distance between the first location and the second location is less than the threshold distance.

4. The method of claim 1, wherein the first location data includes data indicative of a first geographic area and a second geographic area of the first plurality of geographic areas, and wherein a current location of the first UT is within the first geographic area.

5. The method of claim 1, wherein the first UT is mobile and wherein the first location data is based on one or more of: a predetermined plurality of waypoints, a beginning location of the first UT, an ending location of the first UT, a third location of the first UT and associated first direction of the first UT and first speed of the first UT, or current time.

6. The method of claim 1, further comprising:
   receiving a first request from the first UT indicative of a first mode, wherein the first UT ceases sending data to the constellation while in the first mode;
   determining a second UT that is located within a first geographic area of the first plurality of geographic areas;
   determining a first communication parameter associated with sending data from a first satellite of the first plurality of satellites to the second UT;
   transmitting the first downstream data from the first satellite to the first geographic area using the first communication parameter;
   determining a third UT that is located within a second geographic area of the first plurality of geographic areas;
   determining a second communication parameter associated with sending data from a second satellite of the first plurality of satellites to the third UT; and
   transmitting the first downstream data from the second satellite to the second geographic area using the second communication parameter.

7. The method of claim 1, further comprising:
   receiving a handover request from the first UT, wherein the handover request comprises third location data indicative of a third location of the first UT on or after a first time;
   determining, based on the third location data, a second plurality of geographic areas associated with communication service by the constellation of satellites;
   determining a second plurality of communication resources, wherein each instance of the second plurality of communication resources is associated with a respective one of the second plurality of geographic areas;
   operating, after the first time, a second plurality of satellites of the constellation, wherein each of the second plurality of satellites allocates a communication resource from among the second plurality of communication resources for communication with the first UT; and
   sending second downstream data that is addressed to the first UT to the second plurality of geographic areas using the respective ones of the second plurality of satellites.

8. The method of claim 1, further comprising:
   determining third location data indicative of:
      a first time, and
      a third location of the first UT on or after the first time;
   determining, based on the third location data, a second plurality of geographic areas associated with communication service by the constellation of satellites;
   determining a second plurality of communication resources, wherein each instance of the second plurality of communication resources is associated with a respective one of the second plurality of geographic areas;
   operating, after the first time, a second plurality of satellites of the constellation, wherein each of the second plurality of satellites allocate a communication resource from among the second plurality of communication resources for communication with the first UT; and
   sending second downstream data that is addressed to the first UT to the second plurality of geographic areas using the respective ones of the second plurality of satellites.

9. The method of claim 1, further comprising:
   receiving a request from the first UT to transition to a first mode;
   receiving, from the first UT, third location data indicative of a third location that is indicative of an actual location of the first UT;

operating, based on the request, the first plurality of satellites to deallocate the first plurality of communication resources;

determining, based on the third location data, a first geographic area associated with communication service by a first satellite of the constellation of satellites;

determining first communication resources associated with the first geographic area;

operating the first satellite based on the first communication resources to allocate a communication resource for communication with the first UT; and sending second downstream data that is addressed to the first UT to the first geographic area using the first satellite.

10. A system comprising:
a constellation of satellites; and
a first set of one or more processors executing instructions to:
determine first location data indicative of a first location, wherein the first location is associated with second location data indicative of a second location of a first user terminal (UT) and the first location data is less accurate than the second location data;
determine, based on the first location data, a first plurality of geographic areas associated with communication service by the constellation of satellites;
determine a first plurality of communication resources, wherein each instance of the first plurality of communication resources is associated with a respective one of the first plurality of geographic areas;
operate a first plurality of satellites of the constellation, wherein each of the first plurality of satellites allocate a communication resource from among the first plurality of communication resources for communication with the first UT; and
send first downstream data that is addressed to the first UT to the first plurality of geographic areas using respective ones of the first plurality of satellites.

11. The system of claim 10, the first set of one or more processors further executing the instructions to:
receive a first request from the first UT indicative of a first mode, wherein the first UT ceases sending data to the constellation while in the first mode;
determine a second UT that is located within a first geographic area of the first plurality of geographic areas;
determine a first communication parameter associated with sending data from a first satellite of the first plurality of satellites to the second UT;
transmit the first downstream data from the first satellite to the first geographic area using the first communication parameter;
determine a third UT that is located within a second geographic area of the first plurality of geographic areas;
determine a second communication parameter associated with sending data from a second satellite of the first plurality of satellites to the third UT; and
transmit the first downstream data from the second satellite to the second geographic area using the second communication parameter.

12. The system of claim 10, the first set of one or more processors further executing the instructions to:
determine a request from the first UT to transition to a first mode;
determine third location data indicative of a third location that is indicative of an actual location of the first UT;

operate, based on the request, the first plurality of satellites to deallocate the first plurality of communication resources;

determine, based on the third location data, a first geographic area of the first plurality of geographic areas associated with communication service by a first satellite of the constellation of satellites;

determine first communication resources associated with the first geographic area;

operate the first satellite based on the first communication resources to allocate communication resources from among the first plurality of communication resources for communication with the first UT; and send second downstream data that is addressed to the first UT to the first geographic area using the first satellite.

13. A system comprising:
a constellation of satellites; and
a first set of one or more processors executing instructions to:
determine first location data associated with a first location of a first user terminal (UT);
determine, based on the first location data, a first plurality of geographic areas;
determine first communication resources, wherein each instance of the first communication resources is associated with a respective one of a first plurality of satellites of the constellation of satellites; and
send first downstream data addressed to the first UT to the first plurality of satellites, wherein each of the first plurality of satellites transmits the first downstream data to respective ones of the first plurality of geographic areas using respective ones of the first communication resources.

14. The system of claim 13, the first set of one or more processors further executing the instructions to:
determine that the first plurality of geographic areas are within a threshold distance of the first location, wherein the first plurality of geographic areas are contiguous.

15. The system of claim 13, wherein current location data is indicative of a second location of the first UT; and
further wherein:
there is a 50% probability that a first distance between the first location and the second location is greater than or equal to a threshold distance, or
there is a 50% probability that a second distance between the first location and the second location is less than the threshold distance.

16. The system of claim 13, wherein the first location data includes data indicative of a first geographic area and a second geographic area of the first plurality of geographic areas, and further wherein a current location of the first UT is within the first geographic area.

17. The system of claim 13, wherein the first location data is based on one or more of: a predetermined plurality of waypoints, a beginning location of the first UT, an ending location of the first UT, a first location of the first UT and associated first direction of the first UT and first speed of the first UT, or current time.

18. The system of claim 13, the first set of one or more processors further executing the instructions to:
receive a first request from the first UT indicative of a first mode, wherein the first UT ceases sending data to the constellation while in the first mode;
determine a second UT that is located within a first geographical area of the first plurality of geographical areas;

determine a first communication parameter associated with sending data from a first satellite of the first plurality of satellites to the second UT;

transmit the first downstream data from the first satellite to the first geographical area using the first communication parameter;

determine a third UT that is located within a second geographic area of the first plurality of geographic areas;

determine a second communication parameter associated with sending data from a second satellite of the first plurality of satellites to the third UT; and transmit the first downstream data from the second satellite to the second geographical area using the second communication parameter.

19. The system of claim 13, the first set of one or more processors further executing the instructions to:

receive a handover request from the first UT, wherein the handover request comprises second location data indicative of a second location of the first UT on or after a first time;

determine, based on the second location data, a second plurality of geographic areas associated with communication service by the constellation of satellites;

determine second communication resources, wherein each instance of the second communication resources is associated with a respective one of a second plurality of satellites of the constellation; and send, after the first time, second downstream data that is addressed to the first UT to the second plurality of satellites, wherein each of the second plurality of satellites transmits the second downstream data to respective ones of the second plurality of geographic areas using respective ones of the second communication resources.

20. The system of claim 13, the first set of one or more processors further executing the instructions to:

determine second location data indicative of a first time and a second location of the first UT on or after the first time;

determine, based on the second location data, a second plurality of geographic areas associated with communication service by the constellation of satellites;

determine second communication resources, wherein each instance of the second communication resources is associated with a respective one of a second plurality of satellites of the constellation; and send, after the first time, second downstream data that is addressed to the first UT to the second plurality of satellites, wherein each of the second plurality of satellites transmits the second downstream data to respective ones of the second plurality of geographic areas using respective ones of the second communication resources.

* * * * *